Patented May 26, 1936

2,041,698

UNITED STATES PATENT OFFICE 2,041,698

AZO DYES AND METHOD FOR THEIR PREPARATION

Samuel Coffey, Huddersfield, and Wilfred Archibald Sexton, Manchester, England, assignors to Imperial Chemical Industries Limited, a corporation of Great Britain No Drawing. Application February 8, 1934, Serial No. 710,375. In Great Britain February 14, 1933

7 Claims. (Cl. 260—95)

This invention relates to new azo dyes and more particularly refers to azo dyes which may be lactamized and rendered insoluble by treatment with dilute mineral acids.

It is an object of this invention to produce new azo dyes which are fast to washing and which are well adapted to commercial use. A further object is to produce azo dyes which may be made insoluble by lactamization, preferably with dilute mineral acids. A still further object is to produce dyes which contain the carboxyl group in both components and in which these carboxyl groups may be eliminated by treatment with acids. Additional objects will appear hereinafter.

These objects are obtained according to the present invention which in its preferred form comprises making an azo compound by combining (1) an arylamide of 2,3-hydroxynaphthoic acid having the following general formula

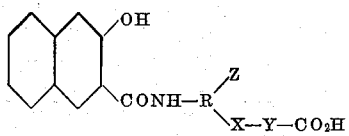

wherein R represents an aromatic nucleus, X represents —O—, —S—, or —NH—, Y represents —CH$_2$—, —CH(alkyl)—, —C(alkyl)$_2$—, Z represents NH$_2$ or NO$_2$, the aforementioned groups being substituted on the aromatic nucleus R in ortho position to the group Z, and (2) a compound having the following general formula

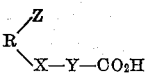

where R, X, Y, and Z have the same significance as before, by means of a diazo group in the one and a substituent adapted to make it a coupling component in the other, and wherein both components are free from water-solubilizing groups, other than the carboxylic groups shown in the formulae, and wherein when one or both Z's stand for NO$_2$, the resulting azo compound is then treated in customary manner, for instance with sodium sulphide to reduce the nitro group or groups to an amino group or groups.

In U. S. Patent No. 2,012,994, processes are described for producing new azo dyes by coupling diazotized or tetrazotized aromatic mono- or diamino compounds with an ortho-amino-arylthioglycollic acid.

In copending applications Serial Nos. 700,016 and 710,374, the latter of which has now resulted in U. S. Patent No. 2,012,991, processes are described for making azo dyes containing amino and thioglycollic acid groups in ortho position to each other in an aromatic nucleus, or certain other groups adapted to form six membered rings on treatment with dilute mineral acids, in which one of the components is an ice colour coupling component such as an arylamide of 2,3-hydroxynaphthoic acid.

The present invention is quite distinct from any of the above in that both components contain groupings adapted to yield lactam or other six-membered rings on treatment with dilute mineral acid. By selecting components in this way, azo dyes which are themselves insoluble may be made from components both of which are soluble. Azo dyes which are superior in many respects to those of U. S. Patent No. 2,012,994 are thus obtained.

The invention may be readily understood by a consideration of the following illustrative examples, in which the quantities are parts by weight.

Example 1.—5.7 parts of 2-nitro-4-aminophenylthioglycollic acid are suspended in 12 parts of 36% hydrochloric acid and 20 parts of water and diazotized by addition of 1.73 parts of sodium nitrite. The diazo solution is neutralized with sodium bicarbonate and then added to an agitated solution of the arylamide as follows.

16 parts of a 61% paste of 2-amino-4-(2',3'-hydroxynaphthoylamino) - phenylthioglycollic acid (described in U. S. Patent No. 2,012,991, Example 1) are added to 250 parts of water containing 25 parts of 10% sodium carbonate.

Coupling is rapid and at the end, the color is salted out by addition of 90 parts of salt. It is then filtered and washed with saturated brine.

The resulting nitro dyestuff is reduced with the theoretical quantity of sodium sulfide solution at 50–60° for 2 hours and the final dyestuff isolated by cooling and salting out. The product is obtained in the form of a red paste which may be dried or not as desired.

Example 2.—1.5 parts of the dyestuff of Example 1 of 70% strength are dissolved in 500 parts of hot water. 10 parts of wool or silk are steeped in this for 5 minutes, at 90–95° C. 20 parts of 2% acetic acid diluted with 50 parts of water are then added in small portions during half an hour at 90–95° C. The sodium salt of the dyestuff is thereby decomposed and the free colored acid becomes adsorbed on the fibre. The dyed material is rinsed and then transferred to a bath of boiling dilute mineral acid, e. g. N/10 hydrochloric acid for 10 minutes. This causes lactamization, giving a dyeing fast to washing. The shade produced is red.

*Example 3.*—4.6 parts of 2-nitro-4-aminophenylthioglycollic acid are dissolved in 100 parts of water and 12 parts of 36% hydrochloric acid. The solution is cooled to 5° and diazotized by addition of 14 parts of 10% sodium nitrite. It is neutralized with sodium bicarbonate and filtered from insoluble impurities. The diazo solution is run into a suspension of p-thioglycollic acid of m-aminobenzoyl-m-aminoanilide of 2,3-hydroxynaphthoic acid, prepared as described in U. S. Patent No. 2,012,991, in quantity equivalent to 10 parts of 100% material in 25 parts of 25% sodium carbonate and 200 parts of water. After coupling, which takes place rapidly, the reaction mixture is warmed to 80° and a solution of 5 parts of sodium sulfide crystals in 25 parts of water is added. After 2 hours at 80° reduction of the nitro group is complete and 85 parts of salt are added. On cooling, the dyestuff is filtered off.

*Example 4.*—The dyestuffs made in Example 3 are applied in the following manner.

2.0 parts of dyestuff (approximately 50% strength) are dissolved in 500 parts of warm water and 14 parts of wool or silk steeped in the liquor for 10 minutes at 90–95°. 30 parts of 2% acetic acid, diluted with 70 parts of water, are added to the dyebath in small portions during half an hour at 90–95°. The red dyestuff is adsorbed on the fibre, which is then rinsed with water and lactamized by immersion for 10 minutes in a hot dilute mineral acid, e. g. boiling N/10 hydrochloric acid.

A bright bluish red dyeing, fast to washing, results.

*Example 5.*—11.3 parts of 2-nitro-4-aminophenoxy-α-propionic acid are dissolved in 27 parts of 36% hydrochloric acid diluted with 50 parts water and diazotized with an equivalent of sodium nitrite at 0–10° C. The resulting solution is then neutralized with soda ash and added to 20.1 parts of sodium 5(2',3'-hydroxynaphthoylamino)-4-chloro-2-aminophenylthioglycollate (prepared according to U. S. Patent No. 2,012,991, Example 12) and 6 parts of sodium hydroxide in 1000 parts of water, 200 parts of salt are then added and the precipitated nitro dyestuff filtered off. The precipitate is then suspended in 300 parts of water and treated with 72 parts of 4N sodium sulfide solution at 70° for 2 hours. 50 parts of salt are then added and the mixture cooled. The precipitated dyestuff is filtered, washed with saturated salt solution and dried.

*Example 6.*—The dyestuff of Example 5 is applied as follows:—

0.7 parts of dyestuff are dissolved in 400 parts of boiling water, 10 parts by weight of wool are added to the dyebath followed by 10 parts of 10% ammonium acetate solution. After three quarters of an hour at 90° the wool is dyed a puce color; the dyed wool is rinsed and then immersed for half an hour at 80° in a bath containing 5% of hydrochloric acid on the weight of wool. The lactamized dyeing is red.

*Example 7.*—2.4 parts of 2-nitro-4-methyl-5-aminophenylthioglycollic acid are boiled with 30 parts of 2N hydrochloric acid, cooled and diazotized at 0–10° by the addition of 20 parts of 0.5N sodium nitrite solution. The diazo solution is neutralized by the addition of sodium bicarbonate.

4 parts of 2-nitro-5-(2',3'-hydroxynaphthoylamino)-phenylthioglycollic acid (prepared according to U. S. Patent No. 2,012,991, Example 6) are pasted with 3.2 parts of barium hydroxide crystals in 40 parts of water and added to a solution of 17.5 parts of ferrous sulfate crystals in 40 parts of water. To the mixture is added a solution of 21 parts of barium hydroxide crystals in 260 parts of water and the whole is stirred for 2 hours at 80–90° C. Excess sodium carbonate is then added and the mixture is filtered.

To the filtrate, which is evaporated to 150 parts and cooled, is added the above diazo solution. After 15 minutes the temperature is raised to 80°, 50 parts of salt are added and the red monolactam dye is filtered and pasted with a mixture of 100 parts of water and 10 parts of 4N sodium sulfite solution. The temperature is maintained at 50° for 2 hours, 30 parts of salt are added and the dilactam dye is filtered and dried.

*Example 8.*—1 part of dyestuff of Example 7 is dissolved in 300 parts of boiling water and 10 parts of wool added. This is followed by 10 parts of 10% ammonium acetate and the bath is kept at 90° for 1 hour. The dyed wool is rinsed and lactamized by immersion of half an hour at 80–90° in a bath containing 5% of hydrochloric acid on the weight of wool. The shade is Bordeaux.

*Example 9.*—1.4 parts of 2-nitro-4-amino-4-methoxyphenylthiolactic acid are boiled with 15 parts of 2N hydrochloric acid, cooled and diazotized by the addition of 10 parts of 0.5N sodium nitrite solution. The diazo solution is neutralized by the addition of sodium bicarbonate.

The above diazo solution is added to a suspension of 2 parts of 2-nitro-5-(2',3'-hydroxynaphthoylamino)-phenylthioglycollic acid (prepared according to U. S. Patent No. 2,012,991, Example 6) in 60 parts of water and 8 parts of 10% sodium carbonate. After 1 hour the temperature is raised to 70° and the dye is precipitated by the addition of salt and filtered. The precipitate is suspended in 50 parts of water, 10 parts of 4N sodium sulfide added and the temperature is maintained at 50° for 2 hours. The dilactam is then precipitated by the addition of salt, filtered and dried.

*Example 10.*—0.6 parts of the dyestuff described above are dissolved in 300 parts of hot water and 10 parts of wool are added. 8 parts of 10% ammonium acetate are now added and the temperature kept at 90° for 1½ hours. The wool is dyed blue and on lactamization by immersion for half an hour at 80° C. in a bath containing 5% hydrochloric or sulphuric acids on the weight of wool the shade becomes violet.

*Example 11.*—1.05 parts of 2-nitro-4-aminophenoxy-acetic acid are boiled with 15 parts of 2N hydrochloric acid, cooled and diazotized at 0–10° by the addition of 10 parts of 0.5N sodium nitrite solution. The diazo solution is neutralized by the addition of sodium carbonate.

To a suspension of 2 parts of methyl-2-nitro-4-(2',3'-hydroxynaphthoylamino)-phenoxy-acetate (prepared according to U. S. Patent No. 2,012,991, Example 9) in 60 parts of water and 8 parts of 10% sodium carbonate there is added the above diazo solution. The resulting precipitate is suspended in 50 parts of water, 10 parts of 4N sodium sulfide solution is added and the temperature is maintained at 50° for 2 hours. The dilactam dye is then precipitated by the addition of salt, filtered and dried.

*Example 12.*—0.6 parts of the dyestuff of Example 11 are dissolved in 300 parts of hot water and 10 parts of wool steeped in the bath; 8 parts of 10% ammonium acetate are added and the bath kept at 90° for 1½ hours. The wool is rinsed and lactamized in the usual way, giving a red dyeing.

*Example 13.*—To a suspension of 6 parts of the paste of the sodium salt of 2-amino-4-(2',3'-hydroxynaphthoylamino)-phenylthiolactic acid (prepared according to U. S. Patent No. 2,012,991, Example 15) is added the diazo solution prepared from 1.4 parts of 2-nitro-4-methyl-5-aminophenylthioglycollic acid as described in Example 7.

After 1 hour the mono-lactam dye is precipitated by the addition of salt and filtered. The solid is suspended in 50 parts of water, 5 parts of 4N sodium sulfide solution is added and the temperature is maintained at 50° for 2 hours. The dilactam dye is then precipitated by the addition of 30 parts of salt, filtered and dried.

*Example 14.*—0.5 parts of the dyestuff of Example 13 are dissolved in 400 parts of hot water with addition of 8 parts of 10% ammonium acetate and the resulting liquor is used to dye 10 parts of wool or silk in the usual way. The shade is reddish blue, becoming Bordeaux on lactamization.

*Example 15.*—In a similar manner to Example 13 there is prepared the new dye from 6 parts of the paste of 2-amino-4-(2',3'-hydroxynaphthoylamino)-phenylthiolactic acid (prepared according to U. S. Patent No. 2,012,991, Example 15) and the diazo solution prepared from 1.4 parts of 2-nitro-5-amino-4-methoxyphenyl-thiolactic acid.

*Example 16.*—The dye obtained according to Example 15 is dyed by the same process as the other dilactam dyes. It gives a blue shade, which becomes violet on lactamization.

*Example 17.*—Another new dilactam dye is prepared in a similar manner to Example 11 except that 2.2 parts of 2-nitro-5-(2',3'-hydroxynaphthoylamino)-4-methoxyphenylthioglycollic acid (prepared according to U. S. Patent No. 2,012,991, Example 13) are used in place of 2 parts of 2-nitro-4-(2',3'-hydroxynaphthoylamino)-phenoxy-acetic acid.

*Example 18.*—Dyeing of the product of Example 17 is carried out by the same general method as described for the other dilactam dyes. A red (lactamized) shade is obtained.

*Example 19.*—Another new dilactam dye is prepared in an exactly similar manner to Example 11 from 2.6 parts of 2,3-hydroxynaphthoyl-m-3'-nitro-benzamido-anilide-4'-thioglycollic acid (O H — $C_{10}H_6$ — CONH — $C_6H_4$ — NHCO — $C_6H_3$ ($NO_2$)—$SCH_2COOH$; Example 4 of U. S. Patent No. 2,012,991) and the diazo solution prepared from 1.4 parts of 2-nitro-5-amino-4-methoxyphenylthiolactic acid.

*Example 20.*—Wool or silk is dyed with the dye obtained according to Example 19 by the same general method as described above. The shade before lactamization is blue, becoming violet after the acid treatment.

In the aforementioned examples the nitro group of the resulting azo compound was reduced with sodium sulfide, it is of course obvious that this is only one of the several well known methods of accomplishing this result.

The present invention permits the production of dyes having satisfactory fastness properties. These dyes may readily be rendered insoluble, and in all cases are understood to be capable of lactamization. This invention is of particular value in that it embraces and renders efficacious the selection of an exceedingly wide range of diazo bases and coupling components.

As many apparently widely different embodiments of this invention may be made without departing from the spirit and scope thereof, it is to be understood that the invention is not limited to the specific embodiments thereof except as defined in the appended claims.

In the claims below, the phrase "water-solubilizing group" should be understood as embracing the sulfonic acid and carboxylic acid groups, and their alkali-metal salts. These radicals are well known for their ability to impart water-solubility to aromatic compounds, and form a natural group, well recognized in the art. Also, in view of the capacity of our novel compounds of existing in three different forms, namely free acid, salt form, and lactam form, and in view of the ready convertibility of these three forms into one another by simple treatment with acids or alkalis, respectively, it should be understood that the phrase "having in the form of its free acid the formula (so and so)", when referring to a compound or a dyestuff, is intended as a generic expression to cover all three forms.

We claim:

1. A process of producing a water-soluble azo dyestuff adapted to be transformed into a water-insoluble form on the fiber dyed therewith, which comprises diazotizing an arylamine of the benzene series containing further in ortho position to each other a nitro group and a group of the form X—Y—$CO_2H$ wherein X stands for oxygen, sulfur or the imine group, while Y stands for a radical of the series $CH_2$, CH(alkyl), and C(alkyl)$_2$, said arylamine being free of other water-solubilizing groups, coupling the nitro-diazo body thus produced to an anilide of 2,3-hydroxy-naphthoic acid which possesses as its sole water-solubilizing factor a pair of ortho-positioned lactamizable substituents of the formulas Z and X—Y—$CO_2H$, where Z stands for $NH_2$ or $NO_2$, and X and Y have the same general definitions as above, and subjecting the resulting azo dyestuff to reduction whereby to reduce the nitro groups to corresponding amino groups.

2. A process of producing a water-soluble azo dyestuff adapted to be transformed into a water-insoluble form on the fiber dyed therewith, which comprises diazotizing an arylamine of the benzene series containing further in ortho position to each other a nitro group and a thioglycollic acid group but being free from any further solubilizing groups, coupling the nitrodiazo body thus produced with an anilide of 2,3-hydroxynaphthoic acid which carries in the anilide nucleus a thioglycollic acid radical and a group Z in ortho position thereto, wherein Z stands for $NH_2$ or $NO_2$, but which is free from other water-solubilizing groups, and reducing the resulting azo compound whereby to convert the nitro groups into amino groups.

3. Azo dyes having in the form of their free acids the following general formula

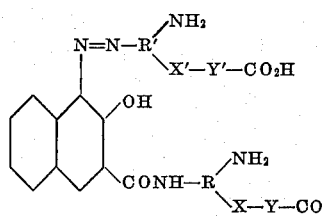

where R and R' represent aromatic nuclei of the benzene series, X and X' represent —O—, —S—, or —NH—, Y and Y' represent —CH₂—, —CH(alkyl)—, —C(alkyl)₂, the groups $$X—Y—CO_2H \text{ and } X'—Y'—CO_2H$$

being located on the aromatic nuclei R and R' in ortho position to the amino groups, said dyes being free from water-solubilizing groups beyond the CO₂H groups shown in the above formula.

4. An azo dyestuff being characterized by the presence in its structure of an arylamide of 2,3-hydroxy-naphthoic acid, and being further characterized by the presence of a lactamizable pair of substituents both in the diazo component and in the coupling component, whereby said dyestuff possesses water-solubility when in the free acid or alkali-metal salt form, but is adapted to form an insoluble lactam upon fiber dyed therewith by treatment of the latter with dilute mineral acid.

5. An azo dyestuff which in the form of its free acid possesses the formula

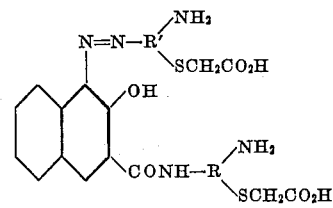

wherein R' represents the radical of an aryl diazo component of the benzene series, while R stands for an aryl radical of the benzene series, the groups NH₂ and SCH₂CO₂H being positioned ortho to each other, and both R' and R being free of any additional water-solubilizing groups.

6. Textile fiber when dyed with a dyestuff as defined in claim 4.

7. Textile fiber when dyed with a dyestuff as defined in claim 5.

SAMUEL COFFEY.
WILFRED ARCHIBALD SEXTON.